United States Patent [19]
Quinlan et al.

[11] 3,780,395
[45] Dec. 25, 1973

[54] WINDSHIELD WIPER ASSEMBLY

[75] Inventors: William J. Quinlan; Lawrence L. Huver, both of Hastings, Mich.

[73] Assignee: Hastings Manufacturing Company, Hastings, Mich.

[22] Filed: Nov. 29, 1972

[21] Appl. No.: 310,447

Related U.S. Application Data

[62] Division of Ser. No. 267,620, June 20, 1972 which is a division of Ser. No. 90,987, Nov. 19, 1970, Pat. No. 3,717,900.

[52] U.S. Cl. ............................................. 15/250.36
[51] Int. Cl. .............................................. B60s 1/38
[58] Field of Search ..................... 15/250.36, 250.42

[56] References Cited
UNITED STATES PATENTS

| | | | |
|---|---|---|---|
| 2,543,383 | 2/1951 | Scinta et al. | 15/250.42 X |
| 3,099,031 | 7/1963 | Ludwig | 15/250.36 X |
| 3,387,316 | 6/1968 | Pearse | 15/250.36 |
| 3,390,415 | 7/1968 | Scinta | 15/250.42 |
| 3,480,986 | 12/1969 | Forster | 15/250.42 X |

FOREIGN PATENTS OR APPLICATIONS

| | | | |
|---|---|---|---|
| 619,321 | 3/1949 | Great Britain | 15/250.36 |

*Primary Examiner*—Peter Feldman
*Attorney*—Munson H. Lane et al.

[57] ABSTRACT

An elongated and longitudinally curved blade body of resiliently flexible material has a hollow crown portion integral with a lower wiping portion. A set of superposed metallic leaf springs are contained within the hollow crown portion for proper application and control of forces on the wiping portion of the blade body. Various types of wiper arm connectors may be secured to the blade body by fasteners which engage the leaf springs in the crown portion.

3 Claims, 21 Drawing Figures

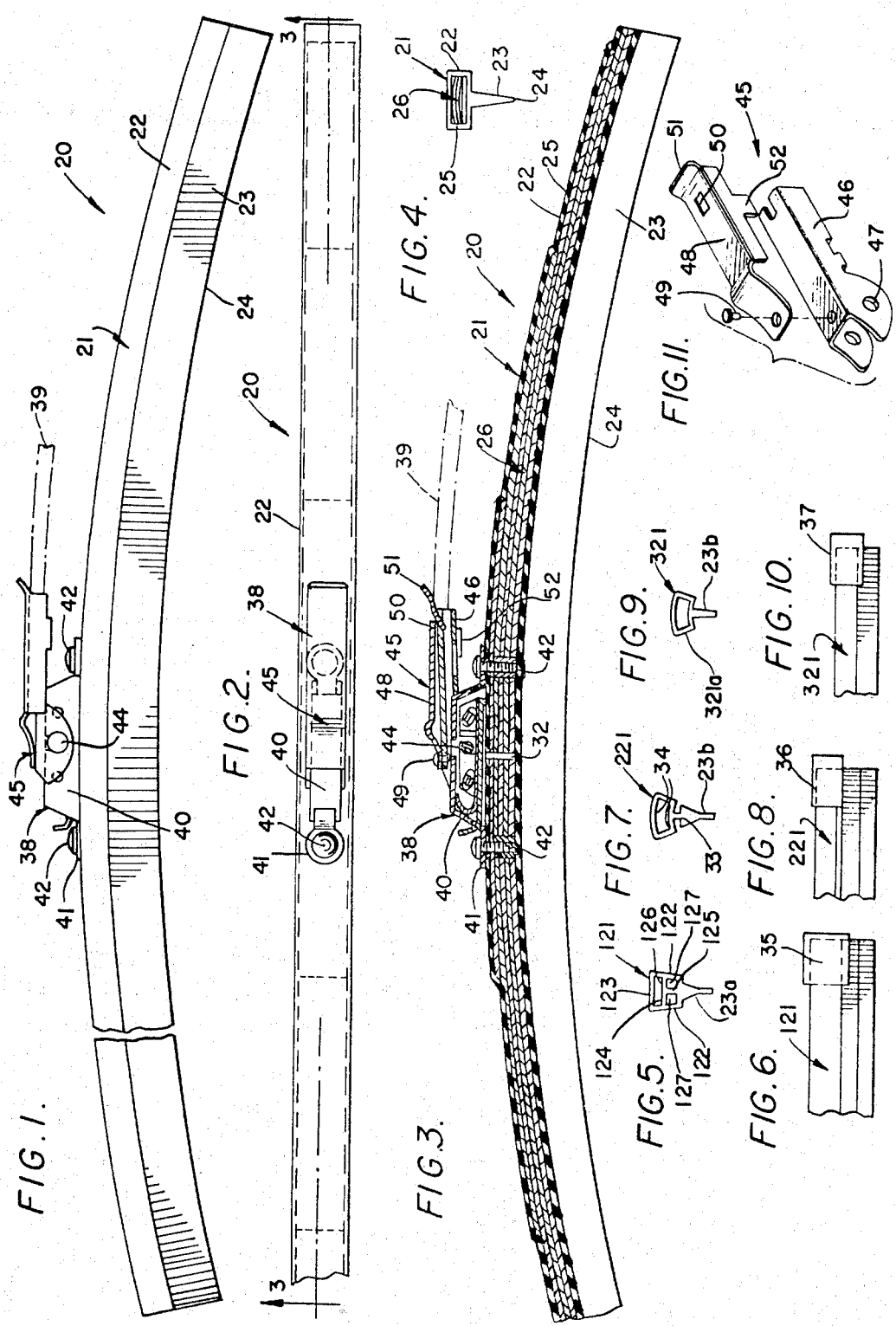

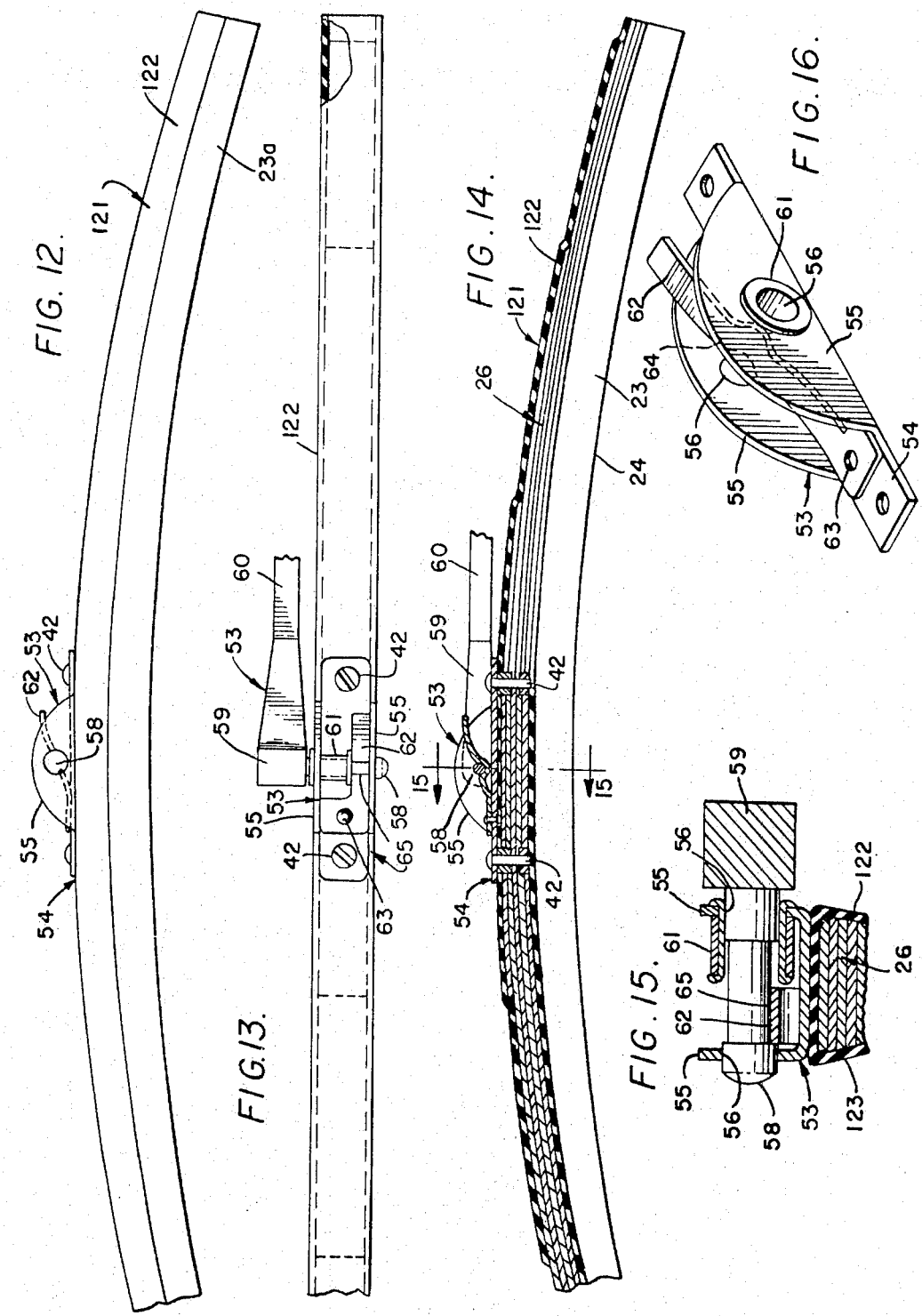

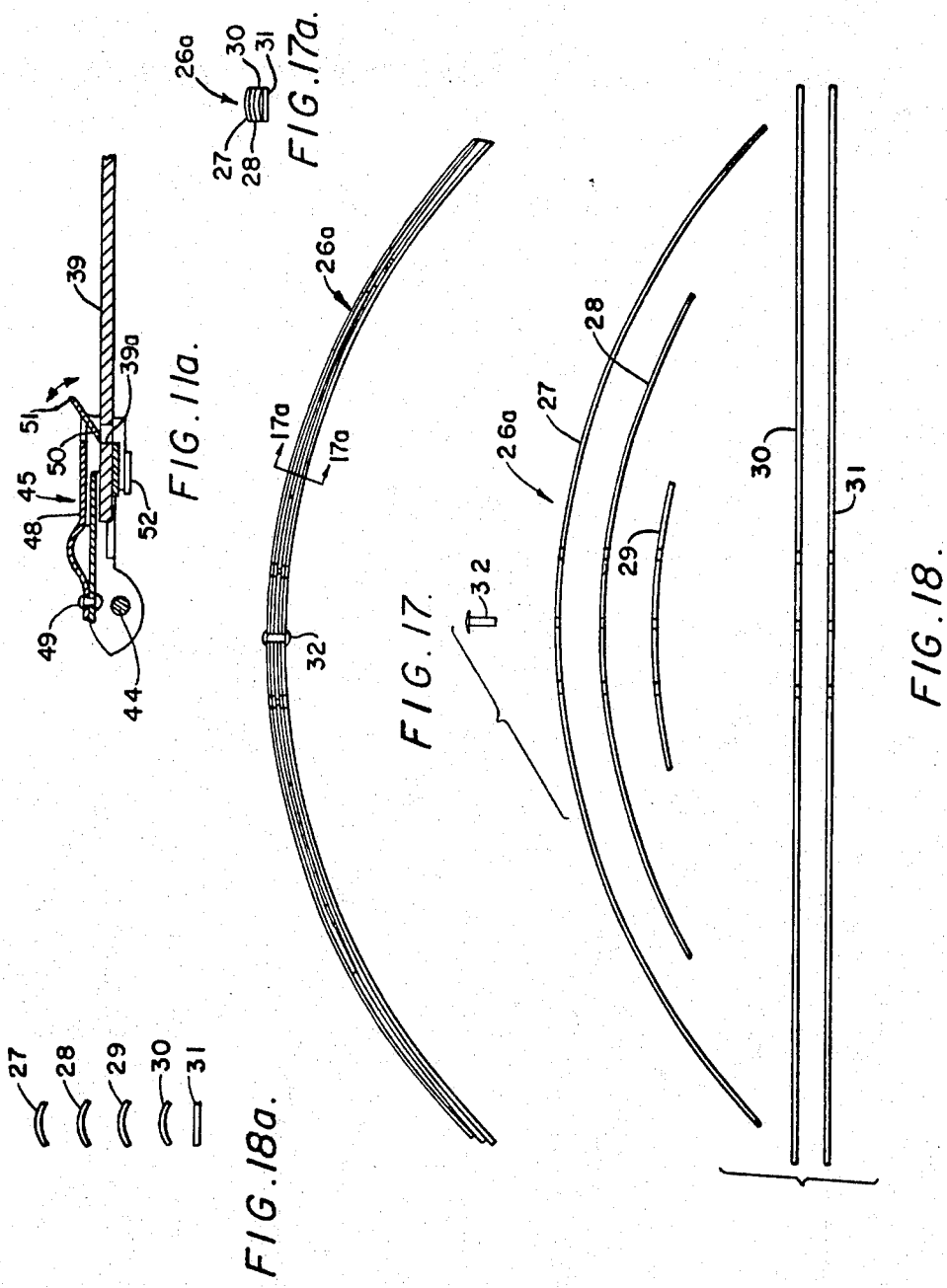

WINDSHIELD WIPER ASSEMBLY

This application is a division of application Ser. No. 267,620, filed June 29, 1972.

This invention relates to new and useful improvements in windshield wiper assemblies, and in particular the invention concerns itself with an improved wiper blade unit as well as with improved connector means for separably attaching the blade unit to a wiper arm.

The principal object of the invention is to provide an improved blade unit which is low in profile and thin in cross-section, so that it does not materially interfere with vision through the windshield when it is in operation.

Another important object of the invention is to provide an improved blade unit which is unitized or encased so as to discourage accumulation of snow, ice, twigs and other foreign matter thereon, thus assuring that the blade unit may flex properly over various windshield curvatures and provide a good clean wiping action.

Another important object of the invention is to provide an improved blade unit which, apart from its connection to the wiper arm, does not have any exposed metallic parts and thus avoids the possibility of scratching the windshield. Another important object of the invention is to provide the blade unit with improved means for separably connecting the same to the wiper arm, such connecting means being especially suitable to assure proper contact of the improved blade unit with different windshield curvatures during the entire operating range of the wiper.

With the foregoing more important objects and features in view and such other objects and features which may become apparent as this specification proceeds, the invention will be understood from the following description taken in conjunction with the accompanying drawings, wherein like characters of references designate like parts, and wherein:

FIG. 1 is a side elevational view showing one embodiment of the wiper assembly of the invention;

FIG. 2 is a fragmentary plan view thereof;

FIG. 3 is a fragmentary longitudinal sectional view, taken substantially in the plane of the line 3—3 in FIG. 2;

FIG. 4 is an end view of the blade unit shown in FIGS. 1–3;

FIG. 5 is an end view of the blade body with a modified cross-section;

FIG. 6 is a fragmentary side elevational view of the blade body of FIG. 5 with an end cap;

FIG. 7 is an end view of the blade body with another modified cross-section;

FIG. 8 is a fragmentary side elevational view of the blade body of FIG. 7 with an end cap;

FIG. 9 is an end view of the blade body with still another modified cross-section;

FIG. 10 is a fragmentary side elevational view of the blade body of FIG. 9 with an end cap;

FIG. 11 is a group perspective view showing components of a wiper arm connector;

FIG. 11a is a vertical sectional view taken along the longitudinal center line of the wiper arm connector shown in FIG. 11 showing the wiper arm connector assembled with the wiper arm inserted within the wiper arm connector;

FIG. 12 is a side elevational view of the wiper assembly with a modified form of arm connector;

FIG. 13 is a fragmentary plan view of the assembly of FIG. 12;

FIG. 14 is a fragmentary longitudinal sectional view of the assembly of FIGS. 12 and 13;

FIG. 15 is an enlarged cross-sectional view, taken substantially in the plane of the line 15—15 in FIG. 14;

FIG. 16 is an enlarged perspective view of the base member of the arm connector shown in FIGS. 12–15;

FIG. 17 is a side elevational view showing a modified arrangement of the leaf spring means; and FIG. 17a is a sectional view of the leaf spring means taken on lines 17a—17a of FIG. 17;

FIG. 18 is an exploded side elevational view of the components of the leaf spring means of FIG. 17; and FIG. 18a is a group view showing the cross sectional shapes of the components of the leaf spring means of FIG. 17.

Reference is now drawn to the accompanying drawings in detail, and more particularly to FIGS. 1–4 which show one embodiment of the windshield wiper assembly of the invention. The same is designated generally by the reference numeral 20 and comprises an elongated and longitudinally curved blade body 21 which is formed integrally from resiliently flexible material such as natural or synthetic rubber, plastic, or the like, and which as such may be produced in a running length by molding or extrusion, being subsequently cut to a determinate length in accordance with the desired length of the blade. As formed by molding or extrusion, the blade body 21 is initially straight, but attains a curvature in the longitudinal direction when it is combined with supporting structure hereinafter described.

In any event, the blade body 21 is cross-sectionally shaped so as to provide a hollow crown portion 22 and a lower wiping portion 23 formed integrally at the center of the base of the crown portion, as best shown in FIG. 4. The wiping portion 23 is of an elongated triangular cross-section, terminating at a wiping edge 24. The crown portion 22 is of a hollow, rectangular cross-section and defines a cavity 25 which extends throughout the length of the blade body. This cavity accommodates metallic leaf spring biasing means 26 which, when inserted into the cavity 25, cause the blade body to assume its longitudinally curved form while applying and controlling forces to assure proper engagement of the wiping portion 23 with the windshield at various curvatures of the latter. Such leaf spring biasing means constitute the aforementioned supporting structure of the blade body.

The leaf spring biasing means 26 consist of a set of leaf springs disposed in superposed relation within the cavity 25 of the crown portion 22. All or at least some of the leaf springs in the set are initially longitudinally curved, although some of them in the set may be initially flat and become longitudinally curved when associated with the others in the set, so as to produce the desired degree of curvature and resiliently yieldable support of the blade unit as a whole. Also, while some of the leaf springs in the set may be transversely flat, others may be transversely curved, thus resisting lateral twisting while still permitting the necessary variations in longitudinal curvature for an efficient windshield wiping action. Further still, some of the leaf springs in the set may be shorter than the others, with FIG. 3 representing an arrangement where the leaf springs in the set progressively increase in length from top to bottom, with the longest spring being disposed adjacent the wiping portion 23 of the blade body. It will be understood that the material of the blade body is sufficiently flexible to shape itself in the region of the crown portion 22 to the "stepped" configuration of the leaf spring biasing means 26 created by utilization of springs of different lengths, as will be apparent from FIG. 3. The open ends of the cavity 25 in the crown portion 22 are closed off by suitable end caps, as will be hereinafter explained in connection with FIGS. 6, 8 and 10.

As will be apparent from the drawings (FIG. 3 and 4) the hollow crown portion 22 fits snugly over the composite spring means 26 both in a transverse plane and from end to end of the hollow crown 22 and of the spring means 26.

FIG. 17 shows a modified arrangement of the metallic leaf spring means designated generally as 26a, which in this instance consist of a long upper leaf spring 27 which is longitudinally curved, a next lower longitudinally curved but shorter spring 28, a next lower longitudinally curved and still shorter spring 29, and two long springs 30, 31 which are initially straight but become curved when assembled with the curved springs 27, 28, 29, as for example by a connecting rivet 32, as will be apparent from FIG. 18. Many other variations of the leaf spring arrangement are, of course, possible in the context of the invention.

The significant aspect is that when the metallic leaf spring means 26 or 26a are installed in the cavity 25 of the crown portion 22, the entire blade body 21 assumes a longitudinally curved form as shown in FIGS. 1 and 3, with the leaf spring biasing means affording the supporting structure which is required not only to retain the blade unit in its curved form, but also to resist lateral flexing or distortion while facilitating longitudinal curvature variations to assure that the full length of the wiping portion 23 of the blade body is properly and controllingly pressed into an effective wiping contact with varying curvatures of the windshield as the blade unit moves back and forth across it.

Even more significant is the fact that the force exerting and controlling facilities afforded by the leaf spring biasing means 26 or 26a are inherently exercised from within the blade body 21 itself, in that the leaf spring means are disposed inside the cavity 25 in the crown portion 22 and are thus completely unitized or encased by the blade body. This is to be distinguished from conventional arrangements where flexible wiper blades are equipped with metallic spines at the outside thereof, and/or with external leaf springs for urging the blade into a wiping contact with the windshield curvature, it being noted that in such conventional arrangements the external reinforcing spine and/or external springs result in a complex structure which, with many of its components exposed, can readily accummulate snow, ice, twigs and other foreign matter so that its function in wiping the windshield is seriously impaired. By comparison, the force exerting and controlling leaf spring means 26 (or 26a) of the invention, being wholly encased in the cavity 25 of the blade body crown portion 22, are not subjected to the weather environment and thus the possibility of encumberance by foreign matter does not arise. Moreover, by unitizing the force exerting and controlling leaf spring means with the blade body itself, the blade body assumes a form which is low in profile and thin in cross-section, so that it does not materially obstruct vision through the windshield while the wiper is in operation.

Several variations in the cross-section of the blade body 21 are possible, the basic one being represented by FIG. 4 which shows the aforementioned hollow rectangularly shaped crown portion 22 integral with the wiping portion 23, the leaf spring means 26 (or 26a) being enclosed in the cavity 25 of the crown portion 22.

One such variation is represented by FIG. 5 in which the blade body 121 is of a truncated cross-section including upwardly divergent side walls 122 connected by a top wall 123, the crown portion of the blade body being divided by a horizontal partition 124 and by a vertical web 125 into an upper cavity 126 which contains the leaf spring means 26 (or 26a), and a pair of lower cavities 127 which are separated from each other by the web 125. In this particular arrangement, although the spring leaf means are contained only in the upper cavity 126, the two lower cavities 127 afford a certain amount of added flexibility inherent in the blade body as a whole, so that effective wiping action may be accomplished by the wiping portion 23a of the blade body. FIG. 7 shows another possible modification of the cross-section of the blade body, in which the lower wiping portion 23b is integrally connected by a thin neck 33 to the crown portion which, like in FIG. 5, is of a truncated form, but its upper and lower walls are transversely curved as indicated at 34 in order to conform to the curvature of transversely curved leaves of the leaf spring means 26 or 26a, as the case may be.

FIG. 9 shows another variation in which the crown portion 321a is much the same as that in the embodiment of FIG. 7 and the wiping portion 23b, similar to the portion 23 in FIG. 4, is connected directly to the base of the crown portion 321a, without the use of a reduced neck such as the neck 33 in FIG. 7.

FIGS. 6, 8 and 10 are fragmentary side elevational views showing closure caps 35, 36 and 37 applied to each and fitting over end of the respective blade bodies 121, 221 and 321 in the respective FIGS. 5, 7 and 9, so as to close off the open ends of the cavities in the crown portion of these blade bodies. The closure caps may be formed from rubber-like or plastic material and suitably bonded to the ends of the blade bodies. Of course, similar such closure caps are also applicable to the ends of the crown portion 22 in FIGS. 1-3 in order to close off the ends of the cavity 25 in the crown portion 22 in these Figures.

Referring again to FIGS. 1-3, the blade unit also includes a connector 38 for attaching the same to a wiper arm 39. The connector 38 comprises a base member 40 which is of the type of construction disclosed in our U.S. Pat. No. 3,425,089 issued Feb. 4, 1969, and thus it need not be detailed here except to note that in this instance the base member 40 is provided at its ends with apertured ears 41 to receive screws 42 whereby the base member is secured to the crown portion 22 of the blade. The screws 42 are threaded into the leaf spring means 26, and in addition to mounting the base member 40, these screws may also serve to hold together the individual leaves of the leaf spring means, either in addition to or in substitution for the aforementioned rivet 32.

As in our aforesaid U.S. Pat. No. 3,425,089, the base member 40 has a socket for removably receiving a transverse pin 44 of a cooperating connector member 45 which is attached to the end of the wiper arm 39. In this instance the connector member 45 comprises an arm receiving receptacle 46 having apertured ears 47 for the pin 44, and a leaf spring 48 which is secured to the receptacle 46, as by a rivet 49. The components 46-49 are shown in the exploded view of FIG. 11 and it will be noted that the leaf spring 48 is provided with a detent 50 which seats behind a bayonet 39a on the wiper arm when the latter is inserted into the receptacle, thus removably holding the receptacle in position on the wiper arm. When the receptacle is to be removed from the arm, the leaf spring 48 is raised by its finger-piece 51 in order to disengage the detent 50 from the bayonet 39a on the wiper arm and permit the receptacle to be slid off the arm. The spring 48 is also provided with projections 52 which are turned under the receptacle 46 with some clearance and serve as stops to limit the extent to which the spring may be raised by its finger-piece 51.

FIGS. 12-16 illustrate another type of blade-to-arm connection which in this instance is shown as being applied to the crown portion of the blade body 121 of FIG. 5 rather than to the blade body 21 of FIGS. 1-3, although it is to be understood that the connectors shown in FIGS. 1-3 and 12-16 may be used selectively on any of the different blade bodies as represented by FIGS. 4, 5, 7 and 9.

The connector 53 in FIGS. 12-16 comprise a base member 54 which is secured by the screws 42 to the blade and has a pair of side walls 55 provided with aligned apertures 56. These apertures removably receive a side pin 58 projecting laterally from a member 59 at the end of the wiper arm 60, the member 59 being disposed adjacent to one of the side walls 55 and at the outside thereof, as will be apparent from FIGS. 13 and 15. A rolled bushing 61 is secured to the other of the side walls 55 in register with the aperture 56 therein, the bushing projecting into the space between the two side walls, as shown. A leaf spring 62 is secured by one end thereof to the base member 54, as by a rivet 63, and an intermediate portion of the leaf spring is provided with a concave depression 64 for seating a diametrically reduced portion 65 of the pin 58.

When the spring 62 engages the reduced portion 65 of the pin 58, the pin is prevented from being withdrawn from the apertures 56, thus holding the blade assembled to the wiper arm. The connection may be separated by simply depressing the spring 62 so that it is disengaged from the pin 58 to facilitate withdrawal of the pin from the apertures 56. The bushing 61 acts as a bearing for the pin 58 and also serves as a locating device for the spring lock 62. The longer bearing surface provided for the pin 58 by the bushing 61 effectively reduces possible twisting movement of the inboard and outboard ends of the wiper.

While in the foregoing there have been described and shown the preferred embodiments of the invention, various modifications and equivalents may be resorted to within the spirit and scope of the invention as claimed.

What is claimed as new is:

1. An elongated windshield wiper blade formed integrally from resiliently flexible material, said blade having a performed hollow crown portion and a lower wiping portion integral with the base of said crown portion, siad crown portion being defined in cross section by a concavo-convex base wall, a concavo-convex top wall parallel to said base wall and upwardly divergent and elongated side walls connecting said base wall and said top wall, said base wall, top wall and side walls defining a cavity extending longitudinally through said crown portion.

2. The windshield wiper blade set forth in claim 1 wherein said lower wiping portion is tapered from its juncture with said crown downwardly to a narrow wiping edge.

3. The windshield wiper blade set forth in claim 1 wherein said wiping portion includes a narrow elongated wiper lip portion, an intermediate wiper portion integral with said lip portion and a narrow neck portion connecting said intermediate wiper portion to the base of said crown portion along the longitudinal center line of said crown base, said intermediate portion being triangular in cross section and defined by opposite side surfaces diverging from said narrow lip portion in the direction of said crown portion, and a top surface connecting said side surfaces.

* * * * *